US009234964B2

(12) United States Patent
Mheen et al.

(10) Patent No.: US 9,234,964 B2
(45) Date of Patent: Jan. 12, 2016

(54) LASER RADAR SYSTEM AND METHOD FOR ACQUIRING 3-D IMAGE OF TARGET

(71) Applicant: Electronics and Telecommunications Research Institute, Daejeon (KR)

(72) Inventors: Bongki Mheen, Daejeon (KR); MyoungSook Oh, Daejeon (KR); Kisoo Kim, Daejeon (KR); Jae-Sik Sim, Daejeon (KR); Yong-Hwan Kwon, Daejeon (KR); Eun Soo Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 399 days.

(21) Appl. No.: 13/916,250

(22) Filed: Jun. 12, 2013

(65) Prior Publication Data
US 2014/0240691 A1 Aug. 28, 2014

(30) Foreign Application Priority Data

Jun. 14, 2012 (KR) .......................... 10-2012-0063801
May 9, 2013 (KR) .......................... 10-2013-0052336

(51) Int. Cl.
*G01C 3/08* (2006.01)
*G01S 17/89* (2006.01)
*G01S 7/481* (2006.01)
(Continued)

(52) U.S. Cl.
CPC ................. *G01S 17/89* (2013.01); *G01S 7/484* (2013.01); *G01S 7/4815* (2013.01); *G01S 7/4818* (2013.01); *G01S 7/4863* (2013.01)

(58) Field of Classification Search
CPC ..... G01S 17/89; G01S 7/4815; G01S 7/4818; G01S 7/484; G01S 7/4863
See application file for complete search history.

(56) References Cited

U.S. PATENT DOCUMENTS 4,906,094 A * 3/1990 Ashida ............... G01N 15/0205
356/246
5,065,025 A * 11/1991 Doyle ..................... G01N 21/05
250/343

(Continued)

FOREIGN PATENT DOCUMENTS

JP 2009-276248 A 11/2009
KR 10-1145132 B1 5/2012

OTHER PUBLICATIONS

Mitsuhito Mase et al., "A Wide Dynamic Range CMOS Image Sensor With Multiple Exposure-Time Signal Outputs and 12-bit Column-Parallel Cyclic A/D Converters", IEEE Journal of Solid-State Circuits, Dec. 2005, pp. 2787-2795, vol. 40, No. 12.

*Primary Examiner* — Luke Ratcliffe
*Assistant Examiner* — Samantha K Abraham
(74) *Attorney, Agent, or Firm* — Rabin & Berdo, P.C.

(57) ABSTRACT

Disclosed are a laser radar system and a method for acquiring an image of a target, and the laser radar system includes: a beam source to emit the laser beam; a beam deflector disposed between the beam source and the target, and configured to deflect the laser beam emitted from the beam source in a scanning direction of the target as time elapses; and an optical detector configured to detect the laser beam reflected from the target, which is provided a plurality of beam spots having a diameter $D_{RBS}$; and a receiving optical system disposed between the target and the optical detector and configured to converge the laser beam reflected from the target, and the optical detector includes a detecting area having a diameter $D_{DA}$ that satisfies an equation of $\sqrt{2} \times P_{RBS} + 2 \times D_{RBS} \leq D_{DA} \leq 2 \times D_{lens}$ and an equation of $(4/\pi) \times \lambda \times F\_number < D_{RBS} < D_{lens}$.

16 Claims, 10 Drawing Sheets

(51) Int. Cl.
*G01S 7/484* (2006.01)
*G01S 7/486* (2006.01)

(56) References Cited

U.S. PATENT DOCUMENTS

| | | | |
|---|---|---|---|
| 5,671,052 A * | 9/1997 | Kawakubo | G01D 5/347 356/616 |
| 6,414,746 B1 | 7/2002 | Stettner et al. | |
| 7,379,100 B2 | 5/2008 | Gokturk et al. | |
| 7,593,114 B2 * | 9/2009 | Corrain | G02B 7/28 356/520 |
| 2008/0316354 A1 | 12/2008 | Nilehn et al. | |
| 2010/0256967 A1 * | 10/2010 | Smith | G01J 9/00 703/13 |
| 2011/0216304 A1 | 9/2011 | Hall | |

* cited by examiner

LASER RADAR SYSTEM AND METHOD FOR ACQUIRING 3-D IMAGE OF TARGET

CROSS-REFERENCE TO RELATED APPLICATIONS

This application claims benefit priority from Korean Patent Application Nos. 10-2012-0063801, filed on Jun. 14, 2012, and 10-2013-0052336, filed on May 9, 2013, in the Korean Intellectual Property Office, the disclosure of which is incorporated herein in its entirety by reference.

TECHNICAL FIELD

Systems and methods consistent with the exemplary embodiments relates to a laser radar (ladar) system and a method for acquiring a three dimensional (3-D) image of target.

BACKGROUND

A 3-D imaging system can be used for a product such as a 3-D display TV, or the like, and can be used in order to secure a 3-D imaging for a distant military target, a 3-D imaging for monitoring a natural environment such as a landslide, or the like, and various 3-D imaging around a vehicle required for driving an unmanned autonomous vehicle.

In recent years, a ladar system has gotten the spotlight because high-quality 3-D image is required even under various environments.

A ladar system in the related art, which is used to acquire a 3-D image, includes a panoramic scan ladar (PSL) and a forward looking ladar (FLL). The PSL is disclosed in U.S. patent application publication No. 2011/0216304 (Title: HIGH DEFINITION LIDAR SYSTEM) [hereinafter, referred to as 'Related Art 1'] and the FLL is disclosed in U.S. Pat. No. 6,414,746 (Title: 3-D IMAGING MULTIPLE TARGET LASER RADAR) [hereinafter, referred to as 'Related Art 2"].

Related Art 1 includes a plurality of laser generating modules and a plurality of optical detectors, for example, four laser generating modules and a '4×1' optical detector array. In the case of driving of Related Art 1, the laser generating module and the optical detector array may be configured to operate at different times or at the same time.

However, in Related Art 1, it is difficult to align the respective laser generating modules and respective pairs of optical detectors corresponding thereto so that the plurality of laser generating modules and the optical detector array are scanned in one line form or in a predetermined form. That is, an operation of examining a spatial viewing range of signals detected by the respective optical detectors and modifying a layout of the plurality of laser generating modules and the optical detector array to conform with a specification is required. This process may influence the price of the module and negatively influence mass production.

Further, in Related Art 1, a 2-D image (in general, distance information from a vertical-direction line) can be secured without rotation of the module. In order to acquire the 3-D images, however, an entire transmission/reception module including the plurality of laser modules and the optical detector array may be rotated.

Related Art 2 is constituted by a plurality of optical detectors that irradiates an optical signal generated by a laser generating module to a wide region and thereafter, detects light reflected on and returned from a target, that is, an 'M×N' optical detector array. In detail, a pulse laser generating device generating a short pulse evenly irradiates a laser to a wide surface at a predetermined diffusion angle through a diffuser, or the like. In this case, it is characterized that an irradiation region is extended depending on a distance and repeated light pulse irradiation surfaces are generated. The light pulse irradiation surfaces are hit and reflected on the target, reflected optical signals are collected through a light receiving lens, and the collected optical signals are detected through the optical detector array. In this case, the respective detectors of the optical detector array individually operate, measure time differences and magnitudes of the reflected optical signals at every positions of respective pixels, and a 3-D image of an object that reflects the optical signal may be formed by collecting the information.

However, since Related Art 2 requires comparatively high laser pulse power, it is difficult to implement a pulse laser module having a high pulse repetition frequency, and as a result, it is difficult to secure a high frame rate.

Further, In Related Art 2, pixel readout circuits that perform processing such as detecting an optical signal, which is reflected on the object and is incident independently as a pixel signal, are required to detect the signals of the respective optical detectors without influences from neighboring detectors in implementing an optical detector array, the pixel readout circuit parts are arranged in a 2-D array pattern, parts, which transfer and process signals generated from the insides of the pixels, are provided on outer edges thereof, and finally, a readout IC (ROIC), which can transmit the signals to the outside through an interface pad positioned around an edge of a chip, is required.

This type of ROIC includes both digital and analog ROICs. Since a sufficient signal to noise ratio needs to be secured even in a narrow pixel region, it is difficult to implement ROIC and manufacturing cost of the ROIC is high. Further, since the ROIC and the optical detector array are generally implemented by using different substrates, the ROIC and the optical detector array cannot be manufactured at the same time and are connected by a flip-chip method which is comparatively high in terms of cost. Consequently, since a video system having a complicated structure uses a short laser pulse on a wide surface, the video system has a characteristic (flash video) to acquire a still video with respect to an object (for example, rotating wings of a helicopter) which moves at a high speed, and as a result, the video system is used for a military purpose, but in general, total manufacturing cost of the system is high, and as a result, it is difficult to popularize the system.

SUMMARY

Accordingly, one or more exemplary embodiments provide a laser radar system suitable for mass production, which can minimize an effort such as an optical path alignment required to acquire a 3-D image, or the like and reduce total implementation cost.

The present disclosure has been made in an effort to provide a laser radar system in which stability is high and a high-speed operation is possible because a driver in which motion such as rotation of an entire sensor module, or the like is required can be removed or substantially reduced, and which can be implemented in a simpler composition without requiring a high-priced optical detector array, a focal plane array (FPA), and a readout IC (ROIC) which needs to be driven for each pixel of a complicated composition in order to drive the FPA are not required while spoiling a design of an applied product.

The present disclosure has been made in an effort to provide a laser radar system that can comparatively easily remove or reduce a blind spot which is not detected when the laser radar system is mounted on a vehicle, or the like.

The present disclosure has been made in an effort to provide a laser radar system which can be driven for a wide area in association with a target.

The present disclosure has been made in an effort to provide a laser radar system that can set resolution of 3-D imaging data differently for each area.

The present disclosure has been made in an effort to provide a laser radar system that can acquire remote data for a concerned region and conditionally acquire data of a wide region for other areas by using a method of simultaneously or driving a 3-D image including remote data providing a high SNR mode with respect to a narrow angle and short-distance data providing a low SNR mode with respect to a wide angle or conditionally driving some of the 3-D image in some cases.

The foregoing and/or other aspects may be achieved by providing a laser radar system acquiring an image of a target by using a laser beam, including: a beam source to emit the laser beam; a beam deflector disposed between the beam source and the target, and configured to deflect the laser beam emitted from the beam source in a scanning direction of the target as time elapses; an optical detector configured to detect the laser beam reflected from the target with, which is provided a plurality of beam spots having a diameter $D_{RBS}$; and, a receiving optical system disposed between the target and the optical detector and configured to converge the laser beam reflected from the target, wherein the optical detector includes a a detecting area having a size $D_{DA}$ that satisfies [Equation 1] and [Equation 2] below.

$$\sqrt{2} \times P_{RBS} + 2 \times D_{RBS} \leq D_{DA} \leq 2 \times D_{lens} \qquad \text{[Equation 1]}$$

Herein, $P_{RBS}$ represents a maximum pitch between the beam spots, $D_{RBS}$ represents the diameter of the beam spot, and $D_{lens}$ represents the pupil diameter of the receiving optical system.

$$(4/\pi) \times \lambda \times F\_\text{number} < D_{RBS} < D_{lens} \qquad \text{[Equation 2]}$$

Herein, $\lambda$, represents the wavelength of the laser beam and F_number represents an F number depending on the pupil diameter of the receiving optical system.

Meanwhile, another exemplary embodiment of the present disclosure provides a method for acquiring an image of a target by using a laser beam in a laser radar system, including: emitting the laser beam; deflecting the laser beam in a scanning direction of the target as time elapses; converging, by a receiving optical system, the laser beam reflected from the target; and detecting, by an optical detector, the laser beam converged by the receiving optical system, which is provided a plurality of beam spots having a diameter $D_{RBS}$, and the optical detector includes a detecting area having a diameter $D_{DA}$ that satisfies [Equation 1] and [Equation 2] below.

$$\sqrt{2} \times P_{RBS} + 2 \times D_{RBS} \leq D_{DA} \leq 2 \times D_{lens} \qquad \text{[Equation 1]}$$

Herein, $P_{RBS}$ represents a maximum pitch between the beam spots, $D_{RBS}$ represents the diameter of the beam spot, and $D_{lens}$ represents a pupil diameter of the receiving optical system.

$$(4/\pi) \times \lambda \times F\_\text{number} < D_{RBS} < D_{lens} \qquad \text{[Equation 2]}$$

Herein, $\lambda$, represents the wavelength of the laser beam and F_number represents an F number depending on the pupil diameter of the receiving optical system.

According to the exemplary embodiments of the present disclosure, a "laser radar based on a large-area optical detector (called a static unified detector (STUD)) in which a beam transmitter emits a beam and deflects the beam in a scanning direction of the target depending on time and a static beam receiver detects a reflected beam from the target is provided to acquire a high-resolution 3-D image in real time.

Further, rotation of a sensor head having a large volume is not required and a laser radar system implemented by not individual detection of a detector array but a single unified detection method is provided to minimize an effort such as optical path alignment, or the like at the time of acquiring a 3-D image and a high-priced detector array or a focal plane array (FPA) is not required and a high-priced ROIC driving the FPA is not required to reduce implementation cost and a laser radar system suitable for mass production can be provided.

Further, a laser radar system including one beam transmitter and one or more bean transmitters is provided to reduce or remove a hood of a vehicle or a region covered with a hood of a vehicle or a part of the system and not detected, that is, a detection disable region, in implementing various application systems.

A laser radar system including one or more receiving optical systems having different wide angle characteristics is provided to simultaneously acquire remote data in a high SNR mode and a wide-angle 3-D image in a low SNR mode.

A laser radar system in which one signal processing module processes signals received through one or more beam receivers is provided, and as a result, the system is very simpler than an existing ROIC composition to analyze a reflected signal for each pixel. Therefore, it is very advantageous in terms of implementation cost.

A laser radar system using one or more beam transmitters that operate in different time zones is provided, and as a result, a system that scans a larger area, efficiently resolves a blind spot, and provides different resolutions for each region as necessary can be implemented.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The present disclosure presents a "large-area optical detector based laser radar" in which a beam transmitter provides a beam to different locations of a target depending on time and a static beam receiver, that is, an optical detector with a large-area detecting area detects the irradiated beam. The laser radar of the present disclosure will also be referred to as a "static unified detector (STUD) based laser radar".

In the laser radar system of the present disclosure, the beam transmitter, repeatedly generates a laser beam having a short laser pulse and deflects the laser beam to different locations of a target (in a scanning direction) depending on time (sequentially deflecting the short laser pulse to space), the static beam receiver collects and detects all or some laser beams reflected from the target and a single or divided large-area detector constituted (integrated) by one or more pieces detects the collected laser beams, and an image processor calculates different locations depending on time and analyzes the laser beam, which is incident at that time, to calculate distance and/or reflected beam intensity information. A 3-D image is acquired by using a calculation result of the distance and/or reflected beam intensity information.

Figure 1:
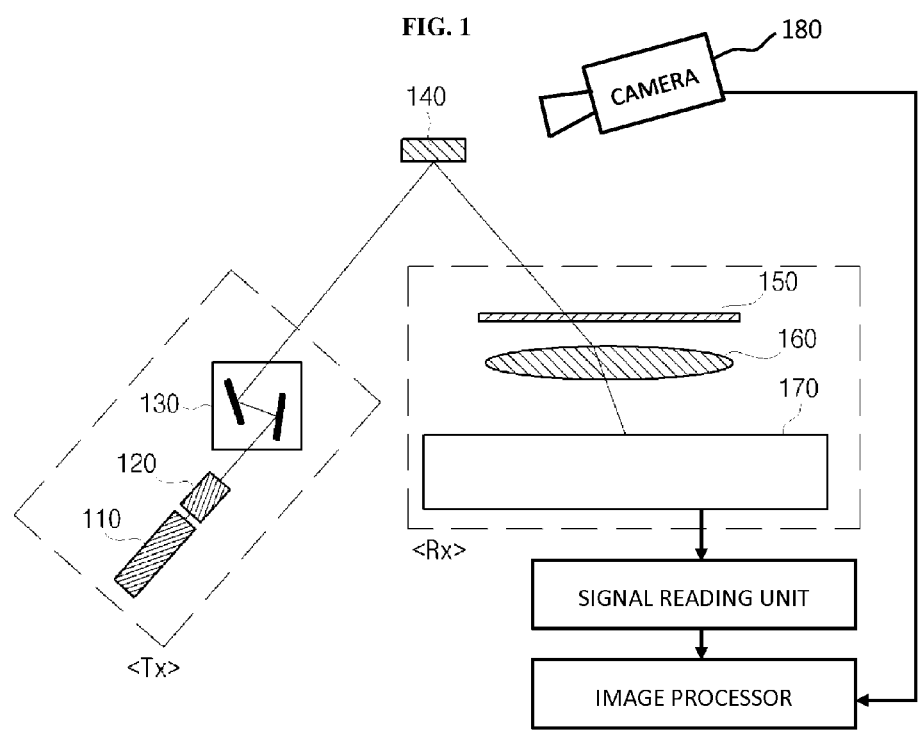
FIG. 1 is a configuration diagram of a laser radar system according to an exemplary embodiment.

FIG. 1 is a configuration diagram of a laser radar system according to an exemplary embodiment.

The laser radar system according to an exemplary embodiment includes a beam transmitter Tx to emit a laser beam and deflect the laser beam to a target 140, and a static beam receiver Rx to receive a laser beam reflected from the target 140.

The beam transmitter Tx may include a beam source 110 to emit a laser beam having a short laser pulse, a beam transmission optical system 120 to converge the laser beam emitted from the beam source, and a beam deflector 130 to deflect the laser beam in a scanning direction of the target 140 depending on time. The beam deflector 130 is disposed between the beam source 110 and the target 140. The beam transmission optical system 120 may be omitted depending on an application and may be configured to have a predetermined diffusion angle by using a diffuser. The beam transmission optical system 120 and the beam deflector 130 may be implemented in one form and the beam transmission optical system 120 and the beam deflector 130 may be implemented while the order thereof is changed.

The static beam receiver Rx may include an optical filter 150, a receiving optical system 160 to converge the laser beam, and an optical detector 170 configured to detect the laser beam reflected from the target 140. The laser beam reflected from the target 140 passes through the optical filter 150 for blocking noise beam and thereafter, reaches the optical detector 170 through a receiving optical system 160 for forming a focus. Herein, the optical filter 150 and the receiving optical system 160 may be changed in the order thereof and the optical filter 150 may be omitted.

The static beam receiver Rx collects all or some laser beams reflected on the target 140 to detect the collected beams through the single or divided or array type optical detector 170. Moreover, the static beam receiver Rx may further include a module that controls a temperature, in order to constantly maintain the performance of the optical detector 170 of which a characteristic is sensitively changed depending on a temperature.

Further, the laser radar system may further include a signal reading unit that reads the laser beam detected by the optical detector 170 by using information on another location of the target 140 as time elapses, which is used in the beam deflector 130. Further, the laser radar system may further include an image processor that calculates distance and/or reflected beam intensity information of each observation point up to the target 140 by using laser beam information read by the signal reading unit and determines a 3-D image of the target 140 by using the distance and/or reflected beam intensity information which is calculated up to each point.

In the present disclosure, the distance and/or reflected beam intensity information is used in determining the 3-D image. That is, when viewed from an airplane, since distance information of an asphalt pavement and a ground surface made of soil, which is just next thereto, is detected as the same height, the reflected beam intensity information may also be used in order to distinguish the pavement and the soil ground surface at different reflectivity for accurate 3-D image determination.

Further, the laser radar system may further include a camera 180 that acquires a 2-D image of the target 140. In this case, the image processor serves to correct or synthesize the 3-D target image and the 2-D target image acquired by the camera.

The static beam receiver Rx may be implemented with a device (for example, TEC; temperature controller) for maintaining the optical detector 170, which is sensitive to a temperature, at a constant temperature so as to have the same characteristic. The static beam receiver Rx may further include a signal processing module that may process a time difference or an intensity of the laser beam reflected from the target 140. Thereafter, an analysis apparatus that transmits data through a connection cable using various communication protocols such as a USB and Gigabit Ethernet and displays data may finally acquire the 3-D image. That is, the image processor calculates different locations depending on time and calculates the distance and/or reflected beam intensity information by analyzing the laser beam which is incident at that time. The 3-D image is acquired by using a calculation result of the distance and/or reflected beam intensity information. Herein, although even the analysis apparatus that displays data has been described, only up to a processing board is processed and thereafter, an actual application (in the case of directly recognizing and processing the 3-D image, such as a vehicle and a robot) may directly receive and process the image.

In FIG. 1, an optical path of the beam transmitter Tx and an optical path of the static beam receiver Rx are differently expressed and this is called a dual axis or bi-axial structure. As another example, the present disclosure may be implemented by a case in which the optical path of the beam transmitter Tx and the optical path of the beam receiver Rx are the same as each other (a single-axis or uni-axial structure).

In FIG. 1, the beam transmission optical system 120 (e.g., a collimator, or the like) may be provided between the beam source 110 and the beam deflector 130. The optical filter 150 may be provided between the target 140 and the receiving optical systems 160.

Figure 2:
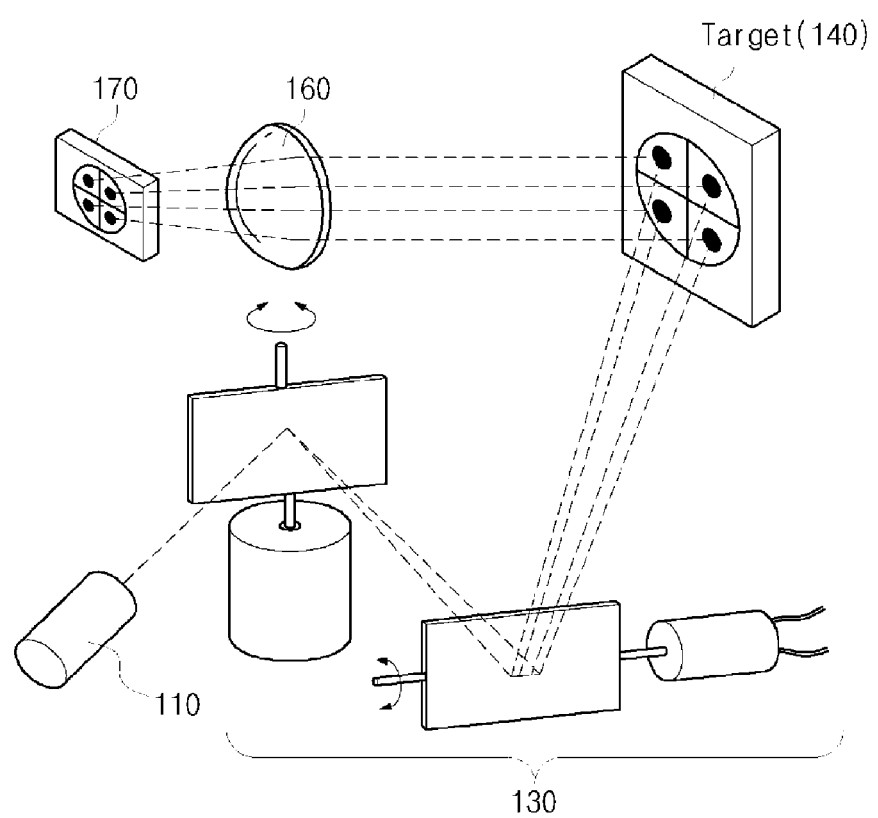
FIG. 2 is an explanatory diagram of a technique in which a beam transmitter irradiates a beam to different locations of a target depending on time and a static beam receiver detects the irradiated beam according to the exemplary embodiment.

FIG. 2 is an explanatory diagram of a technique in which a beam transmitter irradiates a beam to different locations of a target depending on time and a static beam receiver detects the irradiated beam according to the exemplary embodiment. In the present disclosure, in order to illustrate an optically scanned form, the beam deflector 130 scans a front on a 2-D plane of the target 140. In this case, an optically scanned pattern may be variously applied to a circular coordinate or other coordinates of different intervals as well as a 2-D plane coordinate of the same interval. The pattern may be implemented by applying an appropriate driving signal to an optical scanner and may determine the quality of the 3-D image. That is, a scanning operation of the present disclosure is not spraying the laser beam onto a surface by spreading the laser beam, but irradiating each beam pulse to each observation point of the target and regularly scanning a predetermined region when irradiation to all observation points is accumulated depending on time.

In addition, the method of irradiating a laser beam to another location of the target depending on time according to the present disclosure may be various. FIGS. 3A to 3D are explanatory diagrams of various methods of irradiating a laser beam to different locations of a target depending on time according to the exemplary embodiment.

Figure 3A:
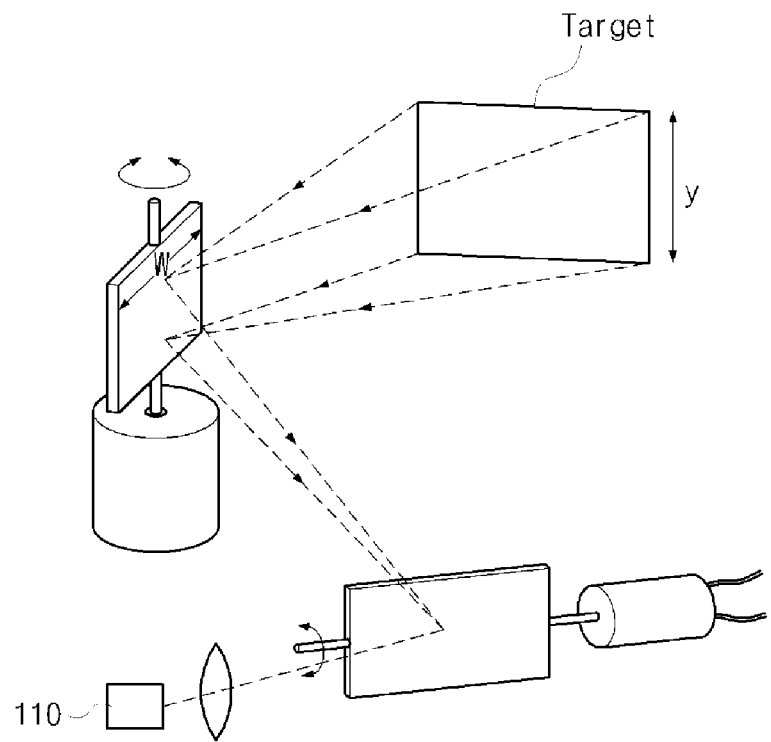
FIGS. 3A to 3D are explanatory diagrams of various methods of irradiating a laser beam to different locations of a target depending on time according to the exemplary embodiment.
Figure 3B:
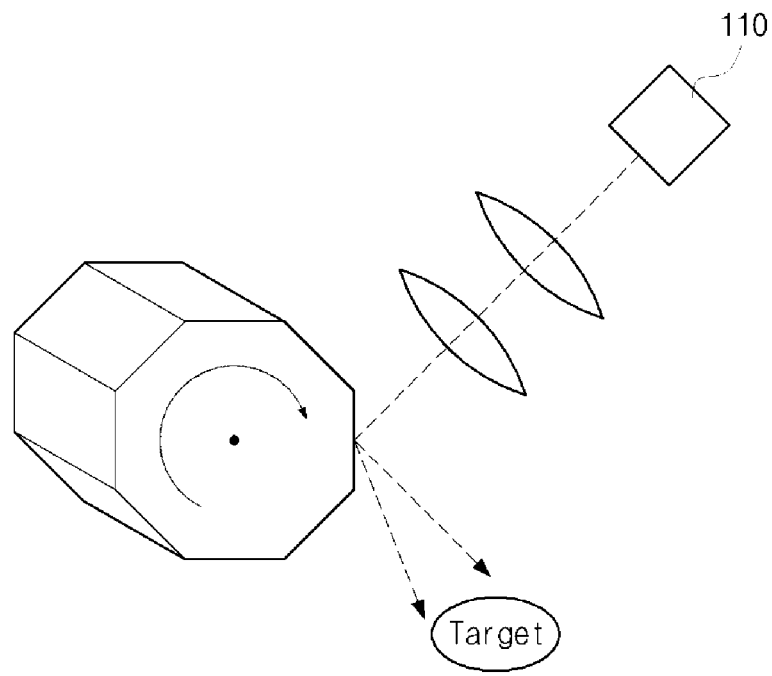
Figure 3C:
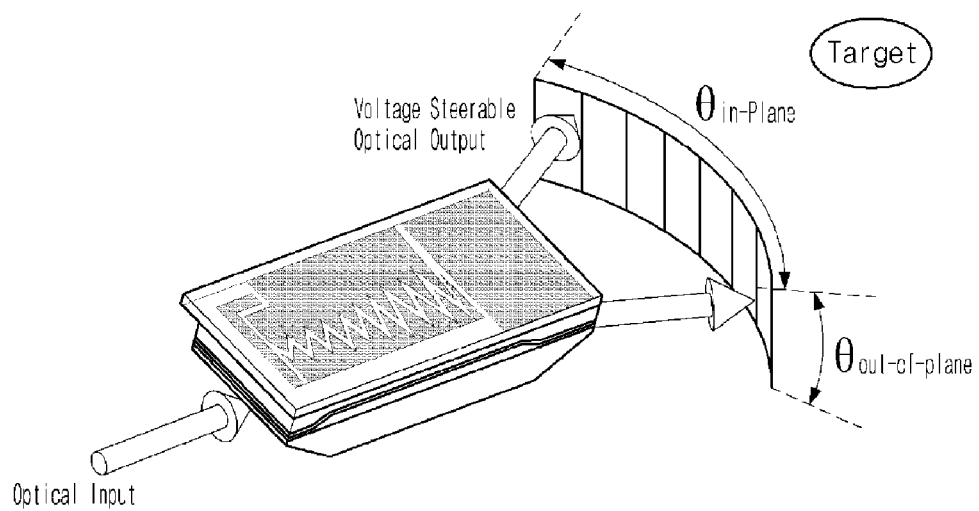

FIG. 3A illustrates a motor driven Galvano Mirror. FIG. 3B illustrates a polygonal rotating mirror. FIG. 3C illustrates an electro-optic (EO) scanner. The EO scanner illustrated in FIG. 3C is implemented by a form of a deflector as a form of an optical waveguide that changes the direction of light by an electrical signal.

Figure 3D:
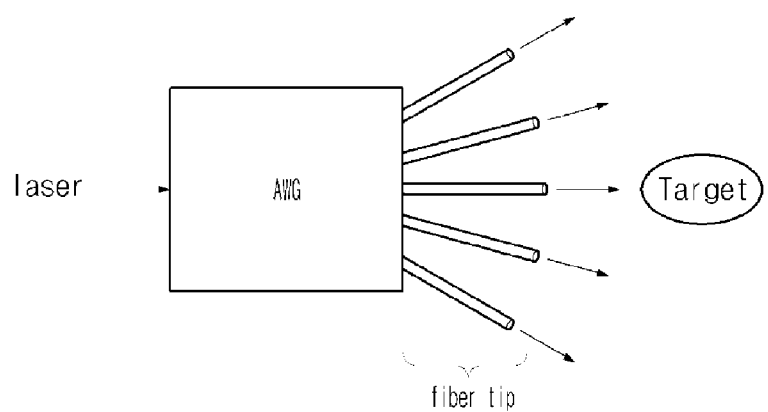

FIG. 3D illustrates a fiber array laser. The fiber array laser illustrated in FIG. 3D may be implemented by an arrayed waveguide grating (AWG). The fiber array laser optically delays an input laser beam or makes the input laser beam have different wavelengths to output the input laser beam to the target through a plurality of fiber tips facing different directions to thereby perform scanning with different wavelengths or different time differences. FIGS. 3C and 3D have an advantage in that a physical driver is not provided, and as a result, the EO scanner and the fiber array laser are resistant to shock and have no vibration and noise.

As another example, the beam deflector may be implemented by a homogeneous or heterogeneous scanner combination structure for 2-D scanning, such as a stepping motor or a brushless DC (BLDC) motor or a rotating minor or an electromagnetic Galvano minor or an acousto-optic deflector or a bi-axial driving scan minor or a MEMS scanner or a MEMS reflector.

Moreover, the beam transmitter Tx may further include a component (hereinafter, referred to as an 'optical pulse beam width controller') for controlling a beam width of an optical pulse. The optical pulse beam width controller may be configured by a collimator, a beam expander, and a lens or one combination or two or more combinations thereof.

Figure 4A:
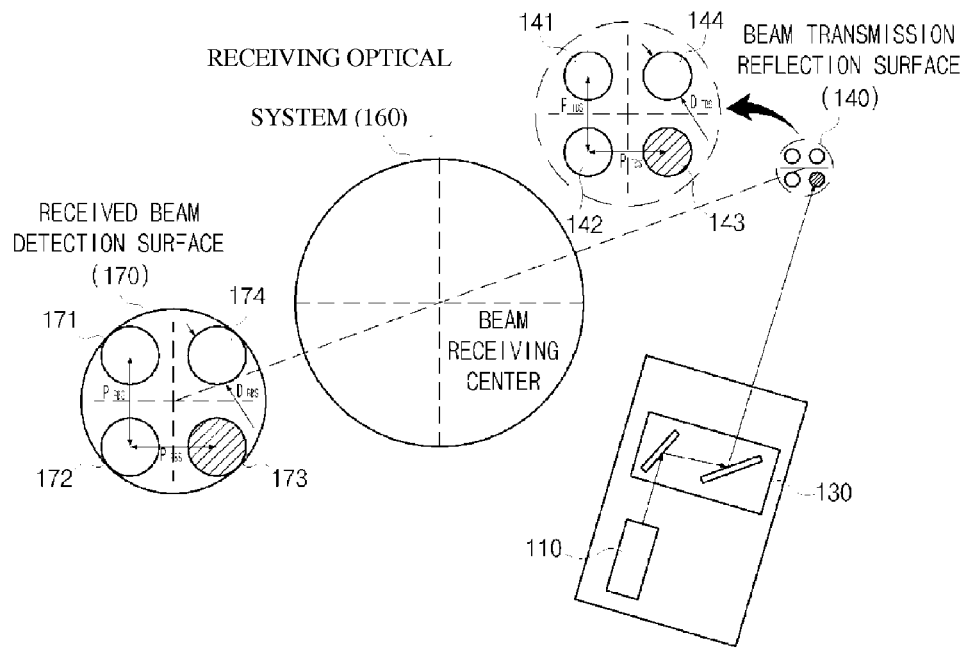
FIGS. 4A and 4B are explanatory diagrams illustrating a concept of a large-area optical detector and the diameter of a detecting area according to the exemplary embodiment.
Figure 4B:
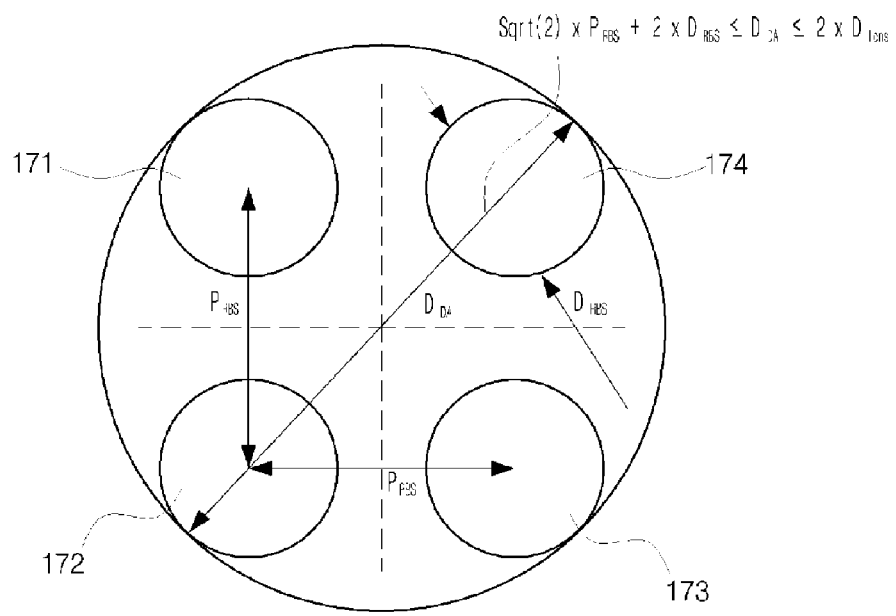
Figure 4C:
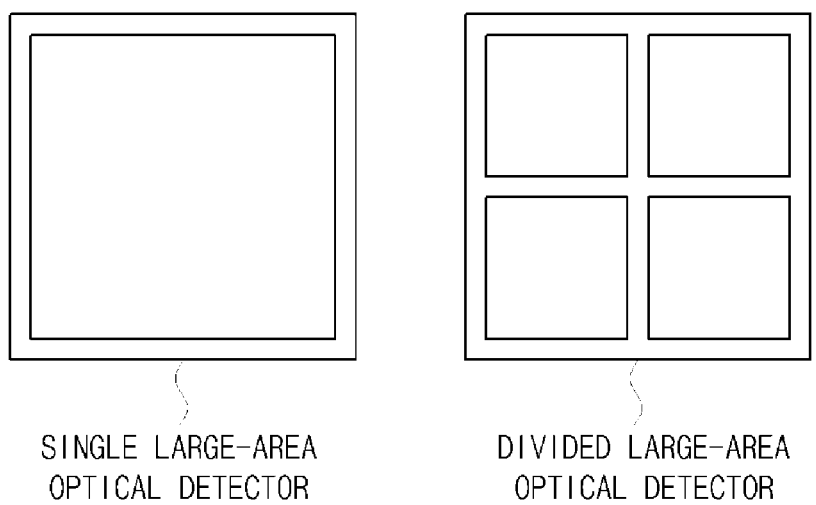
FIG. 4C is an exemplary diagram of the large-area optical detector according to the exemplary embodiment.

Next, the large-area optical detector of the exemplary embodiment will be described with reference to FIGS. 4A to 4C. FIGS. 4A to 4C are explanatory diagrams illustrating a large-area optical detector of the exemplary embodiment and a diameter of a receiving area of the optical detector 140.

In FIG. 4A, the beam transmitter (the pulse laser 110 and the beam deflector 130) emits the laser beam to the target 140. In this case, when viewed in a front direction to acquire 3-D resolution, in order to describe minimum resolution under the condition that a coordinate at two horizontal places and two vertical places are scanned depending on time, the minimum resolution is expressed in a form to accumulate reflection points generated by irradiating the beam to four different points. However, actually, the respective points are sequentially scanned. In FIG. 4A, among beam transmission reflection surface laser beam spots (target beam spots) 141, 142, 143, and 144, the beam transmission reflection surface laser beam spot 143 is formed at the present time. Herein, $P_{TBS}$ represents a pitch of the beam transmission reflection surface laser beam spots (the target beam spots) adjacent to each other and $D_{TBS}$ represents a diameter of the beam transmission reflection surface laser beam spot (the target beam spot).

When the laser beam is irradiated to a remote target, the diameter of the beam transmission reflection surface laser beam spot (target beam spot), $D_{TBS}$, generated when the laser beam hits the target generally depends on a distance. When a collimated beam is transmitted or the beam is transmitted while the initial intensity of the beam is large, the $D_{TBS}$ may be suppressed from being changed or increased depending on the distance. Further, when the laser pulse is irradiated to the remote targets at different locations at different times, the respective pitches of the beam transmission reflection surface laser beam spots, $P_{TBS}$ depend on a driving condition of the beam deflector and under the same driving condition, when the distance increases, the pitch of the beam transmission reflection surface laser beam spots, $P_{TBS}$ linearly increases. The laser signal reflected on the target under the conditions of the $P_{TBS}$ and the $D_{TBS}$ may be displayed on the detecting area 170 of the optical detector through the receiving optical system 160 by converting the conditions of the $P_{TBS}$ and the $D_{TBS}$ into conditions of the pitch of received beam spots, $P_{RBS}$ and the diameter of the received beam spot, $D_{RBS}$.

FIG. 4A illustrates that the laser signal reflected on the target is incident on the detecting area at four different locations symmetrically around the receiving optical system 160 at different times depending on time. That is, in scanning with minimum resolution of total 2×2, parts on which the reflected laser beam is collected are accumulated displayed. Among the received laser beam spots 171, 172, 173, and 174, the received laser beam spot 173, which is marked with the oblique deviant crease line, represents a location which the laser reflection signal enters at present.

Therefore, the present disclosure proposes the detecting area of the large-area optical detector having a minimum area and a maximum area, which may receive most beams, so as to secure a maximum signal to noise ratio (SNR) with respect to a reflection signal which comes from all reflection points, as illustrated in FIG. 4B.

When a condition for receiving all of reflected laser signals, which are incident from a 2×2 image having minimum resolution for acquiring the 3-D image, is calculated, the minimum size of the detecting area, which is required in the optical detector, should be an area including all of received laser beams which are collected depending on time in the optical detector. That is, a minimum diameter of the detecting area ($D_{DAmin}$: diameter of a detecting area) is deduced by "$\sqrt{2} \times P_{RBS} + 2 \times D_{RBS}$". Herein, the pitch of the received laser beam spots, $P_{RBS}$ represents a maximum pitch between the beam spots which are incident in the optical detector at different times, $D_{RBS}$ represents the size of a beam which is irradiated when one reflected laser signal is incident in the optical detector. Of course, the diameter of the received laser beam spot, $D_{RBS}$ may be different in vertical and horizontal pitches and different for each reflected laser signal, but the $D_{RBS}$ is expressed based on a minimum value in the present disclosure.

The maximum size of the detecting area required in the optical detector is deduced below. The maximum size of the detecting area may coincide with the maximum size of the beam which is incident through the receiving optical system 160, and since the maximum size of the detecting area is difficult to be twice larger than the maximum beam size even on the assumption of scanning, the maximum diameter of the detecting area, $D_{DAmax}$ is deduced as "$2 \times D_{lens}$". Herein, $D_{lens}$ represents a pupil diameter of the receiving optical system 160.

In addition, the minimum and maximum sizes of the laser beam for acquiring the 3-D image are the same as those of a single reflected laser beam which is incident through the receiving optical system. Therefore, the minimum beam size is the same as a focused spot size of the lens and an equation thereof is expressed below. Accordingly, the minimum diameter of the received laser beam spot, $D_{RBSmin}$ may be defined as "$(4/\pi) \times \lambda \times F\_number$". Herein, $\lambda$ represents a wavelength of a laser and F_number represents an F number depending on the diameter and focusing of the receiving optical system. In addition, since the maximum diameter of the received laser beam spot, $D_{RBSmax}$ corresponds to the diameter of the receiving optical system. Thus, $D_{RBSmax}$ is equal to $D_{lens}$.

The large-area optical detector of the present disclosure described above is organized below through the equation. The optical detector of the present disclosure includes a detecting area having a diameter $D_{DA}$ that satisfies [Equation 1] and [Equation 2] below.

$$\sqrt{2} \times P_{RBS} + 2 \times D_{RBS} \leq D_{DA} \leq 2 \times D_{lens} \quad \text{[Equation 1]}$$

Herein, $P_{RBS}$ represents the pitch of the received laser beam spots, $D_{RBS}$ represents the diameter of the received laser beam spot, $D_{DA}$ represents the diameter of the detecting area, and $D_{lens}$ represents the pupil diameter of the receiving optical system.

$$(4/\pi) \times \lambda \times F\_number < D_{RBS} < D_{lens} \quad [2]$$

Herein, represents the wavelength of a laser and F_number represents the F number depending on the diameter and focusing of the receiving optical system.

Meanwhile, although described below with reference to FIGS. 5 to 9, the laser radar system of the exemplary embodiment may include a plurality of transmitters and/or a plurality of receivers. That is, in the present disclosure, the receiver may be constituted by two or more optical detectors having different receiving optical system characteristics or two or more optical detectors facing different directions and it may be understood that FIGS. 4A and 4B illustrate the maximum size of the detecting area from the viewpoint of one unit optical detector.

As illustrated in FIG. 4C, the optical detector includes a single detecting area or two or more divided detecting areas. In FIG. 4C, a rectangular optical detector is described as an example, but in the present disclosure, the optical detector may be implemented in various forms such as a hexagonal shape, a circular shape, and an oval shape.

The large-area optical detector is not a single detector having a size in the range of 20 to 50 um which is the diameter of a general optical communication detector, but a detector having a received beam area which may include an optical signal region where the laser pulse signal transmitted by the beam transmitter is reflected on an object and is incident through a receiving optical system. In the present disclosure, a large area represents a size of 100 um or more and less than 1 mm, for example and in some cases, the large area may represent a size of 1 mm or more. In other words, it may be appreciated that the large area has an area to detect most optical signals which are transmitted. The reason is that a location where the reflection signal is incident in the receiver is changed to correspond to different irradiation locations of the target by the transmitter depending on time.

In general, since the width of the laser pulse becomes at the level of several nano seconds to tens of nano seconds, an operating speed of the optical detector needs to be increased in order to detect the width of the laser pulse, and when a beam receiving region is large, output capacitance of the optical detector increases and the operating speed thus decreases, and as a result, a short laser pulse may not be detected. In order to solve the problem, the large-area optical detector is not configured by only one optical detector but may be configured by an optical detector which is designed in various structures. For example, the large-area optical detector may be constituted by a plurality of unit optical detectors in order to reduce parasitic capacitance. That is, the large-area optical detector may be constituted by two or more divided optical detectors and respective unit pixels are collected to constitute one large-area optical detector.

Since one optical pulse may be reflected even at two or more locations, the large-area optical detector may detect two or more optical signals. This means that two or more 3-D point clouds may be generated by one optical pulse. Accordingly, the large-area optical detector may operate even under a climatic condition such as dust in air, snow, or rain by using a multiple detection function. That is, according to the present disclosure, since the laser beam may be reflected from two or more locations in the target to correspond to irradiation of one laser beam pulse in accordance with a scanning operation, two or more coordinate information is generated by detecting two or more reflection laser beams.

The large-area optical detector may be implemented by various methods, and may be implemented by a PN junction photodiode based on silicon, InP, or a semiconductor substrate, a PIN photodiode, and an avalanche photodiode (APD).

As such, in the present disclosure, the large-area optical detector is used, while in the related art, an optical detector array is used, and since in the related art, the incident beam is driven to have different time information, the respective APDs as the optical detector have different time differences. That is, the respective pixels have time information and it is difficult to implement an ROIC which independently analyzes the time information for each pixel. On the contrary, in the present disclosure, for example, since a time of flight (TOF, time information) for the beams, which are incident in two APDs, is the same, circuit configurations of the ROIC and the signal processing module need not be complicated in order to analyze the time information.

That is, by using the large-area optical detector of the present disclosure, circuits and processing methods of a signal processing module that processes an output of one (single) optical detector or a signal processing module that processes outputs of two or more divided optical detectors may be implemented to be the same as each other. However, when it is known that the outputs of the respective optical detectors has the same information in terms of time, by additionally performing a process of adding, as one output, the outputs of the respective optical detectors (for example, an RF combiner or an RF coupler), regardless of a signal emitted from the single optical detector (APD) or signals emitted from a plurality of unit optical detectors (unit APDs), the signals may be integrally processed. Therefore, even though an array APD structure in the related art is used in the present disclosure, all electrical signals emitted from the respective pixels are integrated to implement a signal processing module in which a circuit is easily implemented, like a method of processing the signal emitted to the single optical detector (APD). In other words, it may be appreciated that the divided optical detectors of the present disclosure include all of the unit optical detector (unit APD), the plurality of unit optical detectors, and the array optical detector (array APD).

Hereinafter, various exemplary embodiments of the present disclosure will be described with reference to FIGS. 5 to 9, and the technical configurations of the present disclosure described with reference to FIGS. 1 to 4C and the same technical configuration between the exemplary embodiments will not be described in detail and a compared difference will be primarily described.

Figure 5:
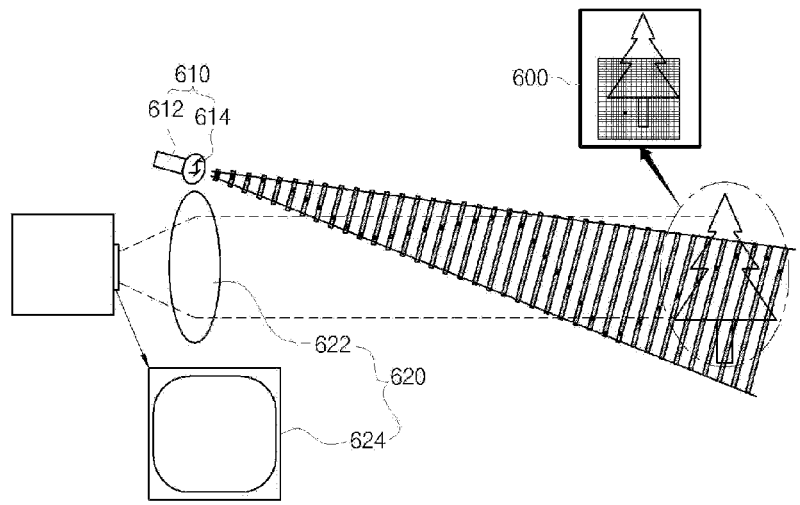
FIG. 5 is a configuration diagram of a laser radar system according to a first exemplary embodiment.

FIG. 5 is a configuration diagram of a laser radar system according to a first exemplary embodiment. FIG. 5 uses a single large-area optical detector. Reference numeral 600 represents a front view of an object.

A beam source 612 may be implemented by a master oscillator power amplifier (MOPA), a diode pumped solid state laser (DPSSL), and an optical integrated modulator. Further, the beam source 612 may be configured to have a high pulse repetition frequency (PRF). The beam source 612 may maintain a high frame rate by scanning one surface by using a high pulse repetition frequency. In general, a pulse repetition frequency of 230 KHz or more is required to scan the QVGA (320×240) image at 30 fps (frame per second) and this may be easily implemented by the MOPA. Since very high laser pulse power (several mJ/pulse) is required in the related art, the pulse repetition frequency is approximately tens of fps, while in the laser radar system according to the present disclosure, since the laser pulse is not irradiated to a wide region, much lower laser power is required, and as a result, a high-speed laser pulse having the high pulse repetition frequency may be generated.

A beam transmitting module 614 includes the beam deflector described above and may further include an optical pulse beam width controller for controlling a beam width of an optical pulse.

A receiving optical system 622 is fixed to collect a reflection signal of a beam transmitted from the beam transmitting module 614 and serves to collect reflection signals, which are incident at a large angle, in a large-area optical detector 624 that detects an actual signal. The receiving optical system 622 may be a fish-eye lens and a user designed lens. Further, the laser radar system according to the present disclosure includes additional optical systems such as a ball lens and a microlens around the large-area optical detector 624 together with the receiving optical system 622 to allow a beam at a larger angle to be incident in the optical detector 624 and to enhance a signal to noise ratio in accordance with an implementation method.

Figure 6:
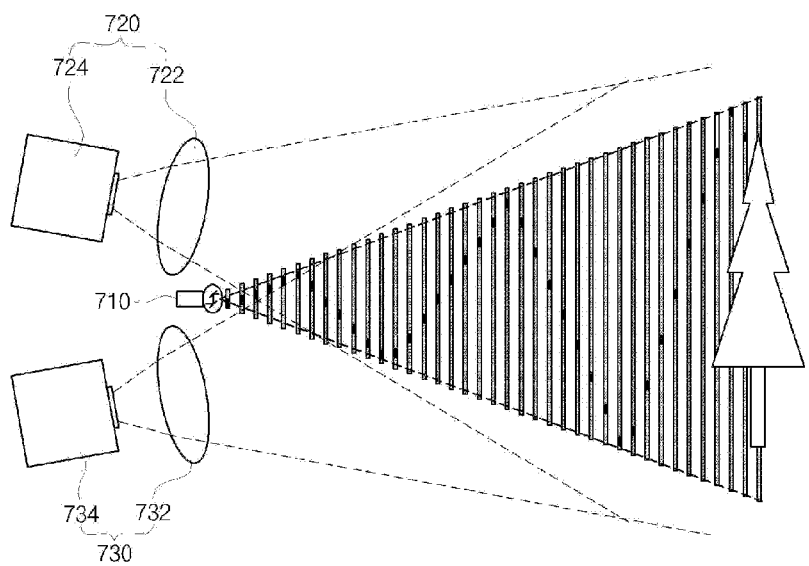
FIG. 6 is a configuration diagram of a laser radar system according to a second exemplary embodiment.

FIG. 6 is a configuration diagram of a laser radar system according to a exemplary embodiment.

The laser radar system includes a beam transmitter 710 and two beam receivers 720 and 730. A region which is not detected by being covered with a hood of a vehicle or a part of a system (hereinafter, referred to as a 'detection disable region') may be present in implementing the vehicle or various application systems and when the laser radar system includes the two beam receivers 720 and 730 as described above, the detection disable region may be reduced or removed.

Figure 7:
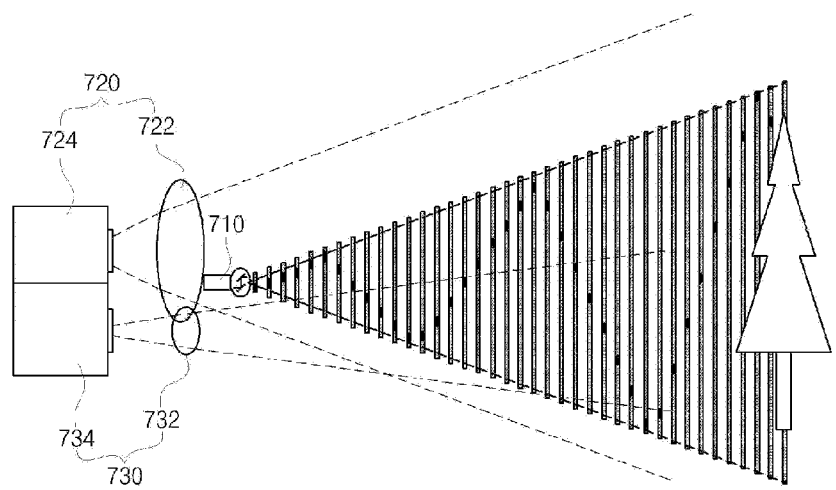
FIG. 7 is a configuration diagram of a laser radar system according to a third exemplary embodiment.

FIG. 7 is a configuration diagram of a laser radar system according to a exemplary embodiment. In FIG. 7, two receiving optical systems having different wide angle characteristics are used, and in this case, two or more different optical detectors 724 and 734 receive the beam through lenses having different characteristics. As another example, one common lens having different wide angle characteristics may be used in an internal region thereof and in this case, two or more different optical detectors receive beams through receiving optical systems 722 and 732 having different optical characteristics.

In the laser radar system of FIG. 7, two receiving optical systems 722 and 732 having different wide angle characteristics are disposed. That is, one receiving optical system 722 is used to view a wide angle and the other receiving optical system 732 is used to view a narrow angle, thereby detecting a relatively remote reflection signal which is not measured at the wide angle. In other words, when two receiving optical system having different wide angle characteristics are used, remote data of a high SNR mode and a wide-angle 3-D image of a low SNR mode may be acquired at the same time. In general, in the case of a vehicular application, up to a long distance of a center part corresponding to a travelling lane needs to be detected, and even through a short distance for a surrounding environment such as a road, or the like is detected, a wider viewing angle may be required and since the laser radar system according to the present disclosure operates by combining the high SNR mode at the narrow angle and the low SNR mode at the wide angle, the requirements may be satisfied.

In FIGS. 6 and 7, signals received through two beam receivers 720 and 730 are added to each other to be processed by one signal processing module. The reason is that the signals emitted from the two beam receivers 720 and 730 are similar signals having almost no time difference of a reflection pulse, and thus a signal is unified by using a simple RF combiner and thereafter, one signal output may be configured, and in one signal output which is generated as described above, the reflection signal may be analyzed at once by using one signal processing module. However, the respective signals may be processed in two signal processing modules in accordance with the requirements of the system and the processing of the signals may be determined in accordance with the positions of the two beam receivers 720 and 730 or the system requirement. However, since even this case is a very simpler system than the existing array ROIC composition that needs to analyze the reflection signal for each pixel, this case is very advantageous in terms of implementation cost.

Further, in FIGS. 6 and 7, one beam transmitter 710 is disposed in front of two beam receivers 720 and 730, but the present disclosure is not limited and one beam transmitter 710 may be disposed at a predetermined position. However, a beam transmission surface of the beam transmitter 710 may be disposed in front of incidence surfaces of the receiving optical systems 722 and 732, in order to reduce direct reflection noise generated when an optical signal is directly incident from the beam transmitter 710 to the beam receivers 720 and 730.

Figure 8:
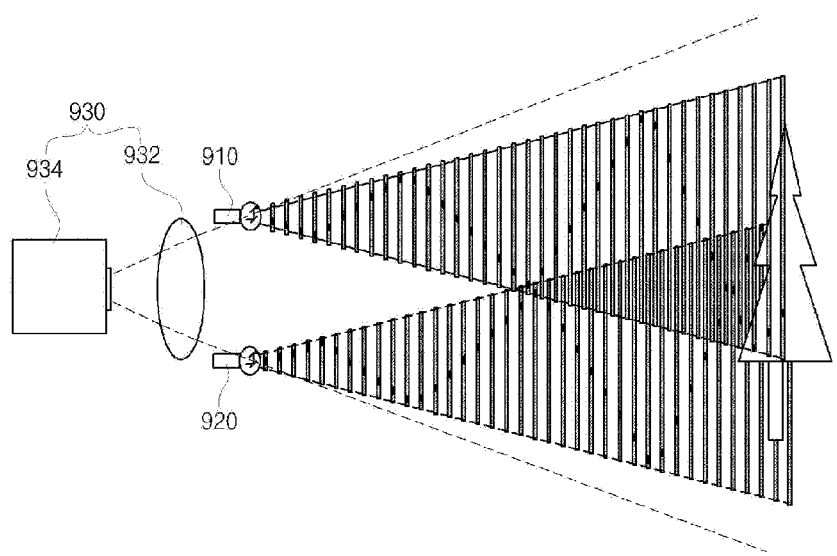
FIG. 8 is a configuration diagram of a laser radar system according to a fourth exemplary embodiment.

FIG. 8 is a configuration diagram of a laser radar system according to a exemplary embodiment.

The laser radar system includes two beam transmitters 910 and 920 and one beam receiver 930. By this configuration, the laser radar system may detect reflection signals of optical signals transmitted from the beam transmitters 910 and 920 that irradiate the beam to different regions by using one beam receiver 930.

Further, an optical pulse generated by one beam transmitter 910 is not mixed with an optical pulse generated by the other beam transmitter 920. To this end, the two beam transmitters 910 and 920 may use a time-division method to generate a laser alternately to each other. The reason is that it is necessary to know which one of the beam transmitters 910 and 920 the optical pulse starts from when the beam receiver 930 detects the incidence of the optical pulse.

Figure 9:
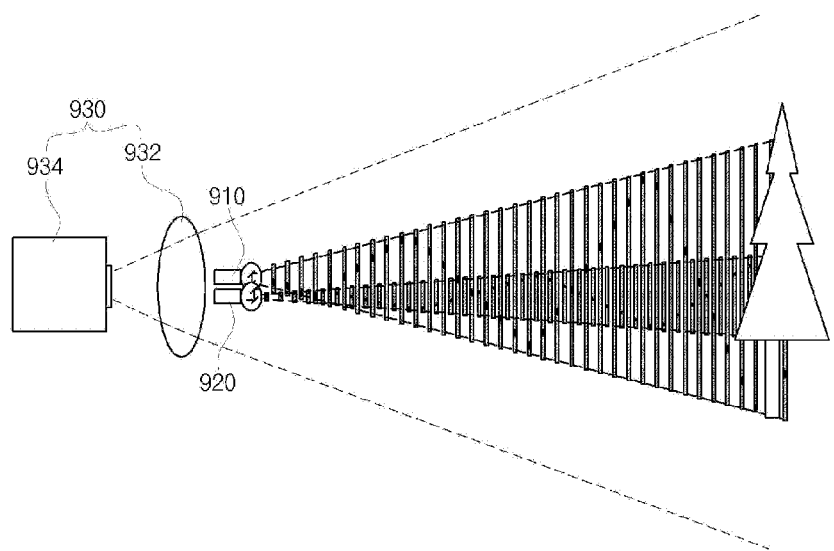
FIG. 9 is a configuration diagram of a laser radar system according to a fifth exemplary embodiment.

FIG. 9 is a configuration diagram of a laser radar system according to a exemplary embodiment.

In the laser radar system of FIG. 8, the two beam transmitters 910 and 920 are disposed side by side, but in the laser radar system illustrated in FIG. 9, the two beam transmitters 910 and 920 are disposed to scan different angles. For example, one beam transmitter 910 minutely scans a narrow region of a center part of the beam receiver 930 and the other beam transmitter 920 scans a relatively wide region. By configuring the laser radar system as described above, resolution may be easily changed for each region with respect to a 3-D image to be viewed. Further, in FIG. 9, centers of the two beam transmitters 910 and 920 are displayed to be different from each other, but the present disclosure is not limited thereto and the centers of the two beam transmitters 910 and 920 may be the same as each other. Further, in FIG. 9, a narrow angle of an optical signal is displayed to be small and the magnitude of the optical signal may depend on a configuration of the beam transmitter in any degree.

Moreover, in FIGS. 8 and 9, two beam transmitters 910 and 920 are disposed in front of one beam receiver 930, but the present disclosure is not limited and two beam transmitters 910 and 920 may be disposed at predetermined positions. However, beam transmission surfaces of the beam transmitters 910 and 920 may be disposed in front of an incidence surface of the receiving optical system 932 of the beam receiver 930, in order to reduce direct reflection noise generated when an optical signal is directly incident from the beam transmitters 910 and 920 to the beam receiver 930.

Accordingly, it is possible to implement a system that scans a larger area, efficiently resolves a blind spot, and provides different resolutions for each region as necessary by using two beam transmitters 910 and 920 which operate at different time zones.

The laser radar system of FIGS. 6 and 7 includes one beam transmitter 710 and two beam receivers 720 and 730 and the laser radar system of FIGS. 8 and 9 includes two beam transmitters 910 and 920 and one beam receiver 930, but the present disclosure is not limited thereto and the laser radar system may include two or more beam transmitters and two or more beam receivers.

Further, all of the laser radar systems according to the present disclosure, which are described with reference to the accompanying drawings, are configured in a bi-axial structure, but the laser radar system may be configured in a uni-axial structure. Further, the beam receiver and the beam transmitter may be variously disposed and the positions of the beam receiver and the beam transmitter may also be variously set.

For example, when the laser radar system of the present disclosure is applied to an automobile, the beam transmitter may be disposed at a hood edge of the automobile and the beam receiver may be disposed at a front glass part of the automobile. As such, since the laser radar system according to the present disclosure has no limit in optical alignment, the laser radar system may significantly increase the degree of freedom in a design of the vehicle, or the like and may be mounted on the vehicle as a 3-D imaging system or a sensor without damaging the design of the vehicle.

Further, in the related art, there is a limit in reducing the size of a module in which a pair of the beam transmitter and the beam receiver exist together, and as a result, there is a restriction in rotational speed, while in the present disclosure, a slip ring for a rotating body need not be used. The slip ring generally includes a mechanical contact type and a liquid contact type using a material such as mercury, and the mechanical contact type is very disadvantageous in durability and the liquid contact type is avoided from being used due to environment pollution caused by mercury, or the like. When the present disclosure is applied to the application such as the vehicle, a unique design of the vehicle is prevented from being critically damaged due to a large-volume rotating body.

Further, the laser radar system according to the present disclosure may be easily aligned. The reason is that the laser radar system according to the present disclosure may allow the beam generated by the beam transmitter to be irradiated to a desired distance range with a predetermined size and may detect the reflected optical signal by using the beam receiver. In particular, in the present disclosure, the beam transmitter and the beam receiver exist as a pair as in the related art, and additional correction for separation of different channels or alignment of the same channels need not be performed. Further, a post correction process of correcting a characteristic between channels, which is not corrected in advance, during a post process need not be performed.

Figure 10A:
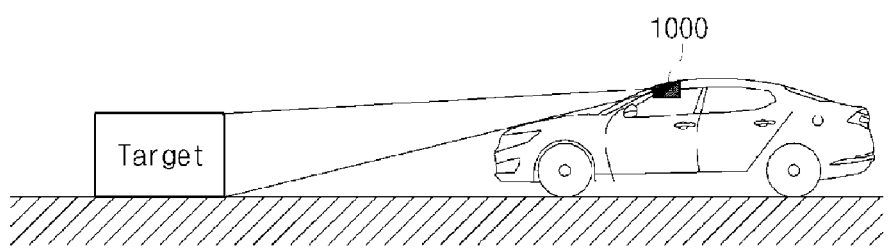
FIGS. 10A and 10B are explanatory diagrams of various applications to which the laser radar system of the exemplary embodiment is applied.
Figure 10B:
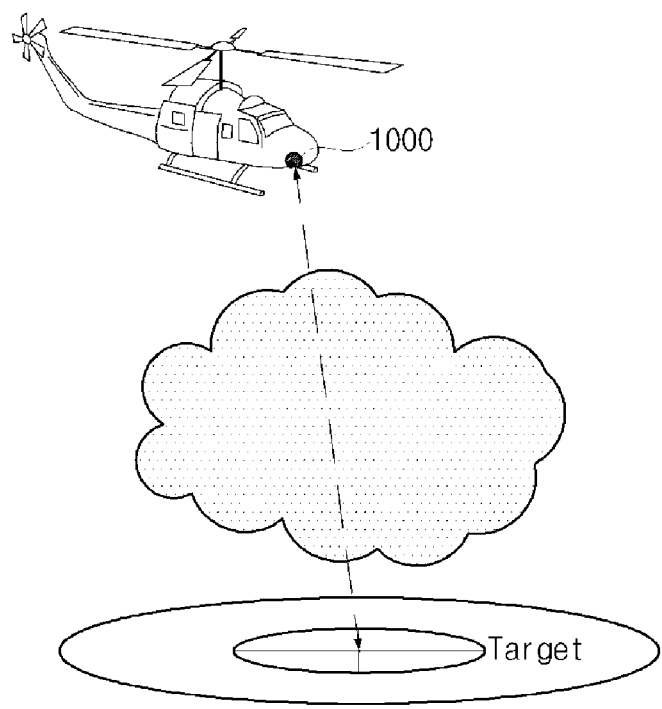

FIGS. 10A and 10B are explanatory diagrams of various applications to which the laser radar system of the exemplary embodiment are applied.

A laser radar system 1000 may be mounted on various applications such as vehicles (an unmanned travelling system, a safety driving system (lane sensing and prevention of collision with human body/preceding vehicle) such as automobiles, ships, or the like, aerospace/national defense (a helicopter, a tank, or the like), a product inspection (product surface inspection, or the like), an unmanned guard system, and the like.

FIG. 10A illustrates a state in which the laser radar system 1000 of the present disclosure is mounted on the automobile. FIG. 10B illustrates a state in which the laser radar system 1000 of the present disclosure is mounted on a helicopter. A helicopter falling accident may be prevented by detecting a front through the laser radar system and the laser radar system may be used in landing guiding, docking guiding, aerial refueling, or the like.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

What is claimed is:

1. A laser radar system acquiring an image of a target by using a laser beam, comprising:
   a beam source to emit the laser beam;
   a beam deflector disposed between the beam source and the target, and configured to deflect the laser beam emitted from the beam source in a scanning direction of the target as time elapses;
   an optical detector configured to detect the laser beam reflected from the target, which is provided a plurality of beam spots having a diameter $D_{RBS}$; and
   a receiving optical system disposed between the target and the optical detector and configured to converge the laser beam reflected from the target,
   wherein the optical detector comprises a detecting area having a size $D_{DA}$ that satisfies [Equation 1] and [Equation 2] below, and $$\sqrt{2} \times P_{RBS} + 2 \times D_{RBS} \leq D_{DA} \leq 2 \times D_{lens} \quad \text{[Equation 1]}$$

wherein $P_{RBS}$ represents a maximum pitch between the beam spots, $D_{RBS}$ represents the diameter of the beam spot, and $D_{lens}$ represents a pupil diameter of the receiving optical system, and $$(4/\pi) \times \lambda \times F\_number < D_{RBS} < D_{lens} \quad \text{[Equation 2]}$$

wherein $\lambda$ represents the wavelength of the laser beam and F_number represents an F number depending on the pupil diameter of the receiving optical system.

2. The laser radar system of claim 1, further comprising:
a signal reading unit configured to read a signal output from the optical detector by using information on another location of the target as time elapses, which is used in the beam deflector.

3. The laser radar system of claim 2, further comprising:
an image processing unit configured to calculate distance and/or reflected beam intensity information of the target by using laser beam information read by the signal reading unit and determine a 3-D image of the target by using the calculated distance and/or reflected beam intensity information.

4. The laser radar system of claim 3, further comprising:
a camera configured to acquire a 2-D image of the target, wherein the image processing unit corrects or synthesizes the determined 3-D target image and the 2-D target image acquired by the camera.

5. The laser radar system of claim 1, wherein:
the optical detector comprises a single detecting area.

6. The laser radar system of claim 1, wherein:
the optical detector comprises two or more divided detecting areas,
wherein, a plurality of signals output from divided detecting areas is combined to be processed as a single output signal.

7. The laser radar system of claim 1, wherein:
the beam deflector periodically deflects the laser beam to viewing points of the target.

8. The laser radar system of claim 1, wherein:
when the laser beam is reflected on one or more locations in the target, one or more coordinate information is obtained by detecting the reflected laser beams.

9. The laser radar system of claim 1, wherein:
the beam deflector comprises a plurality of beam scanning units, and
the respective beam scanning units are disposed to scan the laser beam to different regions or some superimposed regions, or at different angles with respect to the target.

10. The laser radar system of claim 9, wherein:
the respective beam scanning units scan the laser beam in a time-division manner.

11. The laser radar system of claim 1, wherein:
the optical detector comprises a plurality of optical detectors,
wherein, some optical detectors are disposed in parallel or obliquely in order to detect a reflected laser beam which is not detected by the remaining optical detectors.

12. The laser radar system of claim 11, wherein:
the receiving optical system comprises a plurality of receiving lenses having different wide angle characteristics, which are correspond to the plurality of the optical detectors.

13. The laser radar system of claim 1, wherein:
the beam deflector comprises at least any one of a Galvano mirror and a rotary polygon minor, an acousto-optic deflector and a bi-axial driven scan minor, an MEMS scanner, and an MEMS reflector.

14. The laser radar system of claim 1, wherein:
the beam deflector comprises an electro-optic (EO) scanner or a fiber array laser.

15. A method for acquiring an image of a target by using a laser beam in a laser radar system, the method comprising:
emitting the laser beam;
deflecting the laser beam in a scanning direction of the target as time elapses;
converging, by a receiving optical system, the laser beam reflected from the target; and
detecting, by an optical detector, the laser beam converged by the receiving optical system, which is provided a plurality of beam spots having a diameter $D_{RBS}$,
wherein the optical detector comprises a detecting area having a diameter $D_{DA}$ that satisfies [Equation 1] and [Equation 2] below, and $$\sqrt{2} \times P_{RBS} + 2 \times D_{RBS} \leq D_{DA} \leq 2 \times D_{lens} \quad \text{[Equation 1]}$$

wherein $P_{RBS}$ represents a maximum pitch between the beam spots, $D_{RBS}$ represents the diameter of the beam spot, and $D_{lens}$ represents a pupil diameter of the receiving optical system, and $$(4/\pi) \times \lambda \times F\_number < D_{RBS} < D_{lens} \quad \text{[Equation 2]}$$

wherein $\lambda$ represents the wavelength of the laser beam and F_number represents an F number depending on the pupil diameter of the receiving optical system.

16. The method of claim 15, further comprising:
calculating distance and/or reflected beam intensity of the target by using information of the detected laser beam; and
determining an image of the target by using the calculated distance and/or reflected beam intensity.

* * * * *